US006724340B1

(12) United States Patent
Carlos et al.

(10) Patent No.: US 6,724,340 B1
(45) Date of Patent: Apr. 20, 2004

(54) DETECTING SYSTEM HAVING A COHERENT SPARSE APERTURE

(75) Inventors: John Don Carlos, San Diego, CA (US); David R. Kirk, Springfield, VA (US); Jameson Bergin, Nashua, NH (US); Paul M. Techau, Falls Church, VA (US); J. Doss Halsey, Falls Church, VA (US)

(73) Assignee: Information Systems Laboratories, San Diego, CA (US)

( * ) Notice: Subject to any disclaimer, the term of this patent is extended or adjusted under 35 U.S.C. 154(b) by 0 days.

(21) Appl. No.: 10/367,025

(22) Filed: Feb. 13, 2003

(51) Int. Cl.[7] .......................... G01S 13/00; G01S 13/08; G01S 3/02
(52) U.S. Cl. .......................... 342/22; 342/146; 342/465
(58) Field of Search .......................... 342/27, 59, 159, 342/126, 146, 149, 13, 16, 450, 463, 465

(56) References Cited

U.S. PATENT DOCUMENTS

| 2,468,090 | A | * | 4/1949 | Lundberg | 342/465 |
| 3,197,775 | A | * | 7/1965 | Sendler | 342/126 |
| 3,362,024 | A | | 1/1968 | Badewitz | |
| 3,649,125 | A | | 3/1972 | Lehmann | |
| 4,728,959 | A | | 3/1988 | Maloney et al. | |
| 5,187,485 | A | * | 2/1993 | Tsui et al. | 342/357.08 |
| 5,327,144 | A | | 7/1994 | Stilp et al. | |
| 5,334,981 | A | * | 8/1994 | Smith et al. | 342/27 |
| 5,534,876 | A | | 7/1996 | Erickson et al. | |
| 5,583,517 | A | | 12/1996 | Yokev et al. | |
| 5,592,170 | A | * | 1/1997 | Price et al. | 342/22 |
| 5,596,330 | A | | 1/1997 | Yokev et al. | |
| 5,828,306 | A | * | 10/1998 | Curran | 340/573.4 |
| 5,999,131 | A | | 12/1999 | Sullivan | |
| 6,313,783 | B1 | | 11/2001 | Kuntman et al. | |
| 6,388,739 | B1 | * | 5/2002 | Rice | 356/28.5 |
| 6,404,377 | B1 | * | 6/2002 | Lee et al. | 342/22 |

* cited by examiner

Primary Examiner—Thomas H. Tarcza
Assistant Examiner—Brian K Andrea
(74) Attorney, Agent, or Firm—Nydegger & Associates

(57) ABSTRACT

A system and method for detecting a target object through foliage includes a transmitter for generating a low-frequency electromagnetic signal. The signal is directed toward a potential target object for reflection from the potential target object. The system further includes a plurality of mutually dispersed sensors for receiving the reflected signal from the target object. A mechanism is provided to determine the relative locations of the sensors. Signal information from the received signals is sent to a central processor. The central processor inputs the signal information into a beamformer algorithm such as the Maximum Likelihood Method (MLM) to reduce sidelobe ambiguities and resolve the true location of the target from the signal information.

19 Claims, 1 Drawing Sheet

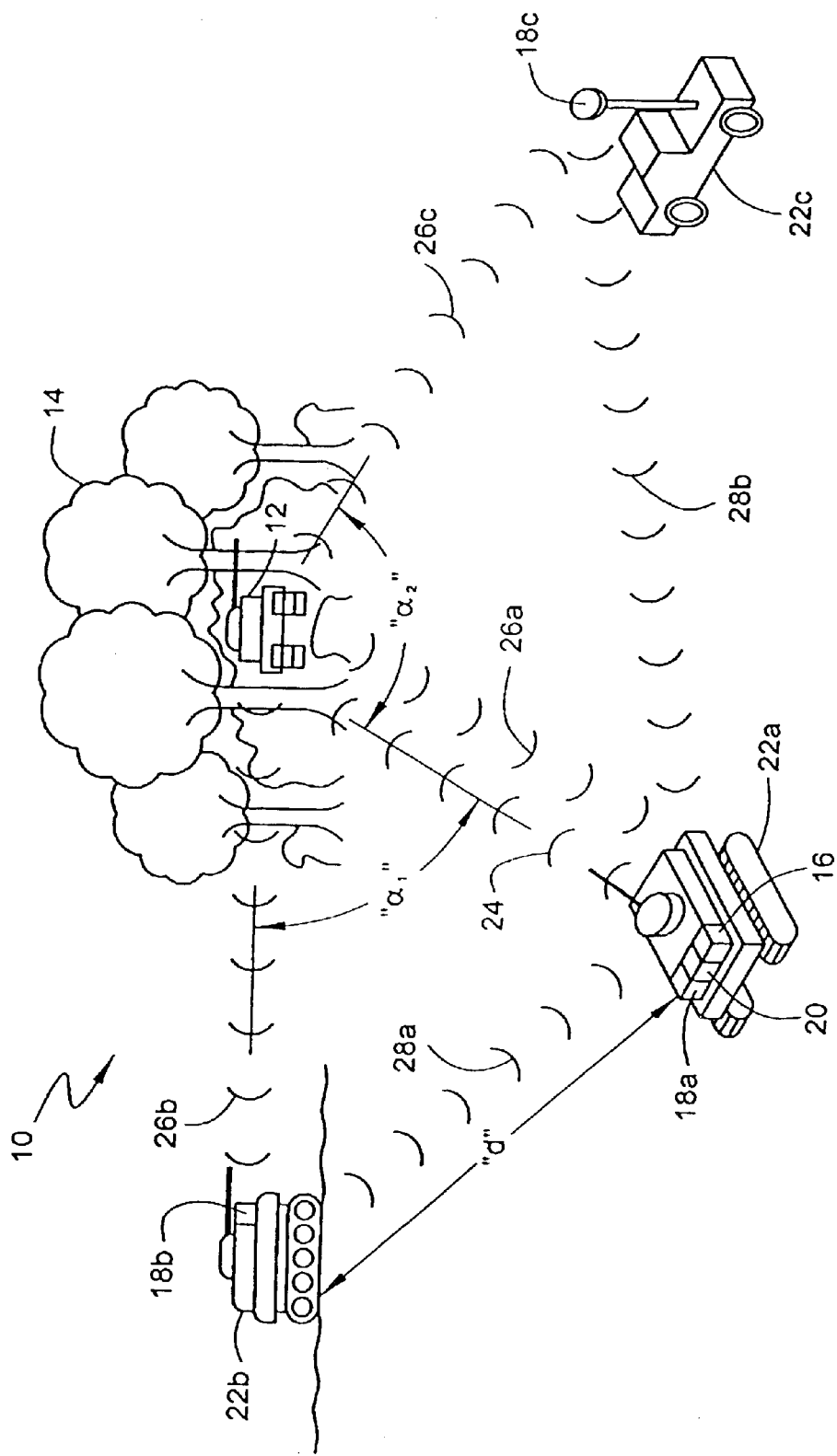
Figure

DETECTING SYSTEM HAVING A COHERENT SPARSE APERTURE

FIELD OF THE INVENTION

The present invention pertains generally to systems for detecting and tracking target objects. More particularly, the present invention pertains to systems capable of detecting target objects through foliage. The present invention is particularly, but not exclusively, useful as a low frequency (<500 MHz) detection system having a coherent sparse aperture that is capable of high resolution at low bandwidths.

BACKGROUND OF THE INVENTION

In battlefield situations it is highly desirable to be able to locate target objects through foliage. More specifically, high quality battlefield awareness requires high resolution at low minimum detectable velocities (MDV). To penetrate foliage with an electromagnetic signal, low frequency systems are required. At these low frequencies, however, single platform sensors generally require a large array having apertures of several meters to achieve high azimuth resolution target detection. As one might expect, these bulky single platform sensors are burdensome in most battlefield situations.

In addition to requiring a large array, single platform sensors also require a large signal bandwidth, on the order of several megahertz, to obtain an adequate range resolution. Obviously, the amount of bandwidth that is available at the low frequencies required for foliage penetration is limited due to the crowded spectrum. For battlefield applications, the limited amount of low frequency bandwidth must often be shared by detection systems and non-detection systems. Thus, for battlefield applications, sufficient bandwidth is generally unavailable at foliage penetrating frequencies to obtain an adequate range resolution using a single platform sensor. In short, single platform systems having foliage penetration capability are bulky and require a large bandwidth.

In light of the above, it is an object of the present invention to provide a battlefield detection system capable of detecting and tracking target objects through foliage. Another object of the present invention is to provide a low frequency detection system that is capable of high resolution using relatively low bandwidth signals. Still another object of the present invention is to utilize distributed vehicles commonly found on a battlefield (i.e. tanks, light armored vehicles, manned and unmanned air vehicles, aerostats, etc.) to establish a coherent sparse aperture for a detection system. Another object of the present invention is to provide a high resolution battlefield detection system that uses only small, lightweight sensors. Yet another object of the present invention is to provide a battlefield detection system that provides accurate measurements of the relative elevation of the target. Another object of the present invention is to provide a battlefield detection system that resolves the location of a target object with little or no sidelobe ambiguities. Yet another object of the present invention is to provide systems for detecting and tracking target objects on a battlefield that are relatively easy to employ, simple to use, and comparatively cost effective.

SUMMARY OF THE PREFERRED EMBODIMENTS

A system and method for detecting and locating a target object through foliage includes a transmitter and a plurality of sparsely arrayed sensors. For the present invention, the transmitter is preferably configured to generate a foliage penetrating electromagnetic signal that has certain characteristics. Specifically, the transmitted signal preferably has a frequency that is less than approximately eight hundred megahertz (800 MHz) and a signal bandwidth of less than approximately one hundred kilohertz (kHz). In a preferred embodiment of the present invention, the transmitted signal is pulsed.

In operation, the transmitted signal is directed toward the suspected location of a potential target object for reflection from the potential target object. For the present invention, the sparsely arrayed sensors are pre-positioned at known locations to receive the reflected signal from the target. Importantly, the sensors are dispersed from each other to increase the angle, $\alpha$, between sensors (i.e. the angle established with the target object location defining the angle vertex). Stated another way, it is a feature of the present invention that the resolution of the detector system increases, as the angle, $\alpha$, between the sensors increases from zero degrees. With the large angle, $\alpha$, between the sensors, the system is capable of relatively high resolution with low minimum detectable velocity (MDV) while using the relatively low bandwidth transmitted signal.

It is contemplated for the present invention that each sensor will be small, lightweight and easily attachable to an existing battlefield vehicle such as a tank, light armor vehicle, unmanned air vehicle (UAV), etc. As such, the sensors will become mutually dispersed as the respective vehicles disperse creating the large angle, $\alpha$, described above. When an accurate measurement of the target object's relative elevation is required, at least one of the sensors is preferably elevated from the remaining receivers to establish a vertical aperture for the system. For the present invention, each sensor receives and processes a common, coherent signal reflected from the target. Upon receipt of the reflected signal, each sensor extracts signal information from the signal for relay to a central processing site. The signal information can include frequency-related, phase-related and amplitude-related measurements.

The system further includes a processor that is positioned at the central processing site. In a preferred embodiment of the present invention, a wireless link is established between the central processing site and each sensor. This wireless link is then used to communicate signal information from each sensor and the location of each sensor to the central processing site. At the central processing site, the processor receives the sensor locations and the signal information from each sensor and coherently processes the signal information to obtain a set of possible locations for the target object. In addition, the processor performs a beamforming algorithm (i.e. an algorithm to reduce sidelobe ambiguities) to isolate the true location of the target from the set of possible locations. In a preferred embodiment of the present invention, a Maximum Likelihood Method (MLM) beamforming algorithm, as disclosed in detail below, is used to reduce sidelobe ambiguities and isolate the true location of the target. In one implementation, the transmitter can be placed on a moving platform such as an aircraft to allow the formation of images using synthetic aperture radar processing (SAR).

BRIEF DESCRIPTION OF THE DRAWINGS

The novel features of this invention, as well as the invention itself, both as to its structure and its operation, will be best understood from the accompanying drawing, taken in conjunction with the accompanying description, in which similar reference characters refer to similar parts, and in which:

The FIGURE is a perspective view of a battlefield situation showing a system in accordance with the present invention for detecting a target object through foliage and determining the location of the target object.

DESCRIPTION OF THE PREFERRED EMBODIMENT

Referring to the FIGURE, a detecting system having a coherent sparse aperture in accordance with the present invention is shown in operation on a battlefield and the system is generally designated 10. In functional overview, the system 10 is designed to detect one or more target objects (such as exemplary target object 12 shown). Further, the system 10 can be configured to track the movements of the target object 12 and/or determine the location of the target object 12. As further described below, the system 10 is capable of detecting, tracking and determining the location of the target object 12 through foliage 14.

In structural overview, the FIGURE shows that the system 10 includes at least one transmitter 16, a plurality of sensors 18a–c and a central processor 20. Preferably, as shown, the transmitter(s) 16, the plurality of sensors 18a–c and the central processor 20 are all mounted on vehicles, of which vehicles 22a–c are only exemplary. For the present invention, the vehicles 22a–c can be any type of vehicle including but not limited to tanks, light armored vehicles, trucks, airplanes, helicopters, aerostats, and unmanned air vehicles (UAV's). Elevated platforms are generally preferable to achieve better foliage penetration.

In a preferred embodiment of the present invention, the transmitter 16 is preferably configured to generate a foliage penetrating electromagnetic signal (i.e. transmitted signal 24) having a frequency less than approximately eight hundred megahertz (800 MHz). For most applications, a signal frequency between approximately thirty megahertz (30 MHz) and approximately five hundred megahertz (500 MHz) is preferably used in the system 10. In accordance with the present invention, the system 10 is capable of relatively high resolution (i.e. on the order of approximately one wavelength of the transmitted signal 24) while using a relatively low bandwidth transmitted signal 24. More specifically, a transmitted signal 24 having a bandwidth of less than approximately five hundred kilohertz (500 kHz) can be used in the system 10. For some applications, a transmitted signal 24 having a bandwidth of approximately one hundred kilohertz (100 kHz) or less can be used in the system 10 with sufficient clutter rejection to locate the target object 12 with high resolution. In, a preferred embodiment of the present invention, the transmitter 16 is configured to produce a pulsed signal of a type well known in the pertinent art, such as an FMCW signal.

As shown in the FIGURE, at least a portion of the transmitted signal 24 is directed toward the target object 12 for reflection from the potential target object 12. Thus, reflected signals, such as exemplary reflected signals 26a–c, propagate from the target object 12, as shown. These reflected signals 26a–c are received and processed by sensors 18a–c, respectively. Although three exemplary sensors 18 are shown, it is to be appreciated that as few as two sensors 18 can be used in the system 10. On the other hand, those skilled in the pertinent art will appreciate that any number of sensors 18, greater than two, can be used in the system 10 of the present invention.

For the present invention, each sensor 18a–c is preferably small, lightweight and has a sensor aperture between one and five meters. Each sensor 18a–c can have a single antenna element or multiple antenna elements can be used to increase sensor 18a–c gain, reduce beamwidth and improve MDV. As further shown, the sensors 18a–c are mounted on vehicles 22a–c, respectively and the vehicles 22a–c are dispersed from each other. With this cooperation of structure, the sensors 18a–c are mutually dispersed and form a sparse array of sensors 18a–c. Important for the present invention is the angle, $\alpha$, formed between pairs of sensors 18a–c, of which angle "$\alpha_1$" and angle "$\alpha_2$" are exemplary. As shown, the angles, $\alpha$, are established with the target object location defining the angle vertex. In accordance with the present invention, the sensors 18a–c are preferably dispersed into a configuration to increase the angles, "$\alpha_1$" and "$\alpha_2$" from zero and thereby increase the resolution of the system 10. Within this parameter, it is to be appreciated that the exact location of the sensors 18a–c relative to the target object 12 is somewhat arbitrary.

To obtain an accurate measurement of the relative elevation of the target object 12, at least one of the sensors 18 (in this case sensor 18c) is preferably elevated from the remaining sensors 18a,b. For example, variations in terrain elevation can be used to elevate one of the sensors 18 on a vehicle 22 or one of the sensors 18 can be elevated on an airborne vehicle 22 such as an airplane. With this cooperation of structure, a vertical aperture is established for the system 10. It follows from the above discussion that the resolution of the system 10 in the vertical direction will be proportional to the differential elevation between sensors 18a–c. The system 10 further includes a mechanism to determine the relative locations of the sensors 18a–c. In one embodiment, GPS receivers (not shown) can be coupled to each sensor 18 to determine the absolute location of each sensor 18. In alternative embodiments of the present invention, beacons (either cooperative or uncooperative) or pinging (i.e. self-calibration) methods are used to determine the location of each sensor 18 relative to the other sensors 18. In another embodiment, high bandwidth, large aperture microwave radar from an airborne platform can be used to determine the absolute location of each sensor 18.

For the present invention, each sensor 18 contains one or more antenna elements (but at least one) to receive and process a common, coherent reflected signal 26 from the target object 12. Upon receipt of the common reflected signal 26, each sensor 18 extracts signal information from the reflected signal 26 that can include both phase-related and amplitude-related measurements. As shown in the FIGURE, a communications link 28 is established between each sensor 18 and the central processor 20 to relay both the signal information as well as the location (relative or absolute) of each sensor 18 from the sensor 18 to the central processor 20. It is to be appreciated that any type of communications link known in the pertinent art can be used for the present invention. For example, a wireless communications link 28a is shown to relay signal information and the location of sensor 18b from sensor 18b to the central processor 20. Similarly, a wireless communications link 28b is shown to relay signal information and the location of sensor 18c from sensor 18c to the central processor 20. For the configuration of the system 10 as shown in the FIGURE wherein the sensor 18a is mounted on the same vehicle 22a as the central processor 20, the communications link 28 between sensor 18a and the central processor 20 can be a low bandwidth link such as a wire (not shown).

It is to be appreciated that the central processor 20 can be arbitrarily positioned for the system 10 and may or may not be mounted on a vehicle 22. Further, it is to be appreciated that the central processor 20 may be mounted on the same vehicle 22 as one of the sensors 18, or the central processor 20 may be positioned at a location remote from all the sensors 18. As indicated above, the central processor 20 receives the signal information and the location of each sensor 18 from each sensor 18 via the communications links 28. Importantly, the central processor 20 coherently processes the signal information to determine the location of the target object 12 with high resolution. To do this, the central processor 20 performs a beamforming algorithm to reduce sidelobes (also called grating lobes and ambiguities) and resolve the true location of the target object 12. In a preferred embodiment of the present invention, a Maximum Likelihood Method (MLM) beamforming algorithm is used to reduce sidelobe ambiguities and resolve the true location of the target object 12.

In greater detail, using an MLM algorithm, coherent signals received at each sensor 18 are processed by the central processor 20 as a coherent sparse array. The steering vector from each sensor 18 to the hypothetical target location is $$[v]_n = e^{-j\frac{2\pi}{\lambda}d_n}$$

where $d_n$ is the distance from sensor n to the target location. The target signal covariance matrix is $$R = [x^H x]$$

where $X_{ij}$ is the received signal. The signals from the sensors 18 can be processed with the Maximum Likelihood (Capon) Method (MLM), $$P_{mlm}(x, y) = \frac{1}{v(x, y)^H R^{-1} v(x, y)}$$

where the steering vector, v(x, y), is explicitly a function of the location (x, y) of the hypothetical target object 12 (as opposed to the angle of arrival). The true target location will result in a peak at the beamformer output. For more information on the MLM method, see J. Capon, "High Resolution Frequency-Wavenumber Spectrum Analysis," Proc. IEEE, Vol. 57, No. 8, August 1969.

An alternative embodiment of the present invention involves the optional step of excluding non-stationary sensors 18 from the signal analysis. In this embodiment, a mechanism is included to determine whether each sensor 18 is stationary during signal reception. For example, a motion sensor (not shown) can be coupled to each sensor 18. Information regarding motion of each sensor 18 can be relayed to the central processor 20 via the communications links 28 to allow the central processor 20 to disregard signal information from non-stationary sensors 18. This alternate embodiment is particularly applicable when only one antenna element per sensor 18 is used. For a system 10 having only one antenna element per sensor 18, requiring the sensors 18 to be stationary restricts clutter to zero doppler and thus facilitates clutter rejection via moving target indicator (MTI) or adaptive Doppler processing.

Another alternate embodiment of the present invention includes the optional step of using the system 10 to first obtain a low resolution location for the target object 12 and then using the low resolution location in a cued search to obtain a high resolution location or high resolution tracking of the target object 12. More specifically, the system 10 can be used in a noncoherent multistatic mode to obtain a low resolution location of the target object 12. With the low resolution location of the target object 12, the system 10 can be used in coherent mode (as described above).

In another embodiment, the transmitter 16 can be placed on a moving vehicle 22 such as an aircraft to allow signals 26 received by the sensors 18 to be used to form images using synthetic aperture radar processing (SAR).

While the particular Detecting System having a Coherent Sparse Aperture as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for detecting a target object through foliage and determining the target object's location, said system comprising:

a transmitter for generating an electromagnetic signal for reflection from said target object, said signal having a frequency less than approximately eight hundred megahertz (800 MHz);

a plurality of sensors for receiving said reflected signal from said target and generating signal information therefrom, said sensors being mutually dispersed at known locations;

a means for coherently processing said signal information and said sensor locations to generate a set of possible target locations, said set including sidelobe ambiguities and the actual location of said target;

at least one wireless link to send signal information from a said sensor to said processing means; and a beamforming means for suppressing said sidelobe ambiguities to resolve said actual location from said set of possible target locations.

2. A system as recited in claim 1 wherein said beamforming means suppresses sidelobe ambiguities using a Maximum Likelihood Method (MLM) algorithm.

3. A system as recited in claim 1 further comprising a means for determining the relative positions of each said sensor.

4. A system as recited in claim 3 wherein said means for determining the relative positions of each said sensor comprises a plurality of global positioning satellite (GPS) locators with one said locator positioned at the location of each said sensor.

5. A system as recited in claim 3 wherein said means for determining the relative positions of each said receiver comprises a beacon transmitter.

6. A system as recited in claim 1 wherein each said sensor has one antenna element to receive said signal.

7. A system as recited in claim 1 wherein each said sensor has a plurality of antenna elements to receive said signal.

8. A system as recited in claim 1 wherein each said sensor is mounted on a different vehicle.

9. A system as recited in claim 8 further comprising a means for determining which sensors are stationary during signal receipt to allow signals received by non-stationary sensors to be eliminated from signal processing.

10. A system as recited in claim 1 wherein said signal has a frequency in the range of approximately thirty megahertz (30 MHz) to approximately eight hundred megahertz (800 MHz).

11. A system as recited in claim 1 wherein two said sensors define an angle, α, with said target located at the vertex of said angle and wherein said two sensors are positioned relative to said target with said angle, α, being between forty and sixty degrees.

12. A system for detecting a target object through foliage and determining the target object's location, said system comprising:

a transmitter for generating an electromagnetic signal for reflection from said target object, said signal having a frequency less than approximately eight hundred megahertz (800 MHz) and a bandwidth less than approximately one hundred kilohertz (100 kHz);

a plurality of mutually dispersed sensors for receiving said reflected signal from said target and generating signal information therefrom;

a central processor for receiving said signal information from each said sensor and coherently processing said signal information to determine the location of said target object; and at least one wireless link to send signal information from a said sensor to said central processor.

13. A system as recited in claim 12 wherein said central processor uses a Maximum Likelihood Method (MLM) beamforming algorithm to reduce sidelobe ambiguities and resolve the true location of said target object.

14. A system as recited in claim 12 wherein said system comprises a wireless link between said central processor and each said sensor to communicate said signal information from each said sensor to said central processor.

15. A method for determining a target object location, said method comprising the steps of:

transmitting an electromagnetic signal for reflection from said target object, said signal having a frequency less than approximately eight hundred megahertz (800 MHz);

receiving said reflected signal at a plurality of mutually dispersed locations and generating received signal information therefrom;

transmitting signal information from at least one sensor over a wireless link to a central processor; and using said received signal information in a beamformer algorithm at said central processor to resolve the location of said target.

16. A method as recited in claim 15 wherein said signal is pulsed.

17. A method as recited in claim 15 wherein said signal information includes measurements of both received signal phase and received signal amplitude.

18. A method as recited in claim 15 wherein said beamformer algorithm is a Maximum Likelihood Method (MLM) algorithm.

19. A method as recited in claim 15 further comprising the step of determining the relative positions of each said receiving location.

\* \* \* \* \*